United States Patent [19]

Schoedl et al.

[11] Patent Number: 5,554,010
[45] Date of Patent: Sep. 10, 1996

[54] APPARATUS FOR FEEDING FUEL FROM A SUPPLY TANK TO AN INTERNAL COMBUSTION ENGINE

[75] Inventors: Roland Schoedl, Hemmingen; Kurt Frank, Schorndorf; Armando Urcuyo, Vaihingen, all of Germany

[73] Assignee: Robert Bosch GmbH, Stuttgart, Germany

[21] Appl. No.: 290,086

[22] Filed: Aug. 12, 1994

[30] Foreign Application Priority Data

Aug. 16, 1993 [DE] Germany ............ 43 27 454.4

[51] Int. Cl.⁶ .................................... F04B 35/04
[52] U.S. Cl. .................. 417/313; 417/423.7; 310/71
[58] Field of Search ................ 417/313, 423.1, 417/423.7, 423.14; 310/71, 89, 112

[56] References Cited

U.S. PATENT DOCUMENTS

| | | |
|---|---|---|
| 3,048,722 | 8/1962 | Baron . |
| 3,861,831 | 1/1975 | Rule ............................. 417/423.14 |
| 4,900,966 | 2/1990 | Winter et al. ..................... 310/68 B |
| 5,013,221 | 5/1991 | Tuckey ............................ 417/423.7 |
| 5,393,206 | 2/1995 | Roth et al. ........................... 417/313 |
| 5,399,075 | 3/1995 | Frank et al. .................... 417/423.14 |

FOREIGN PATENT DOCUMENTS

| | | |
|---|---|---|
| 2078133 | 11/1971 | France . |
| 4036754 | 5/1992 | Germany . |
| 4201401 | 7/1993 | Germany . |

Primary Examiner—Charles Freay
Attorney, Agent, or Firm—Edwin E. Greigg; Ronald E. Greigg

[57] ABSTRACT

An assembly for feeding fuel from a supply tank to an internal combustion engine, having a feed pump which is driven by an electric drive motor and is accommodated with the drive motor in a common housing. The housing is enclosed by means of a connection cap, which has a connection piece to a feed line and in which furthermore two plug connections connected to the drive motor are disposed. According to the invention, these plug connections comprise combined flat plugs with a round plug receptacle, and in them a flat plug protruding axially out of the outer face end of the connection cap has a round plug receptacle on its end protruding into the connection cap, and the combined flat plug and round plug receptacle is formed from a one-piece shaped sheet-metal part. This combined plug connection in a simple way enables both a direct electrical connection of the feed assembly and mounting of an additional electrical component, preferably an additional radio interference suppression unit, via a round plug connection.

10 Claims, 2 Drawing Sheets

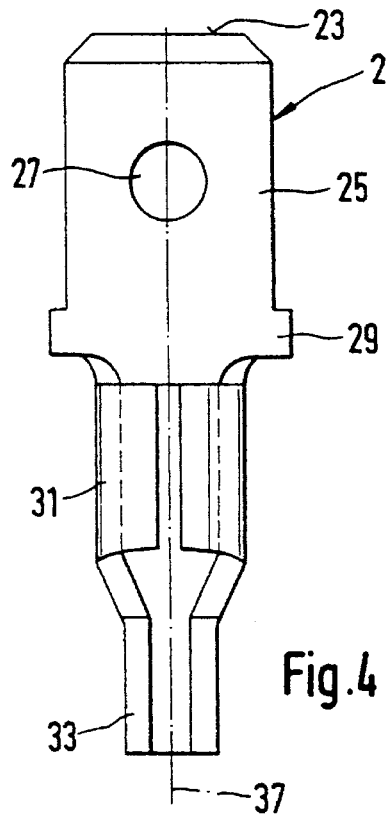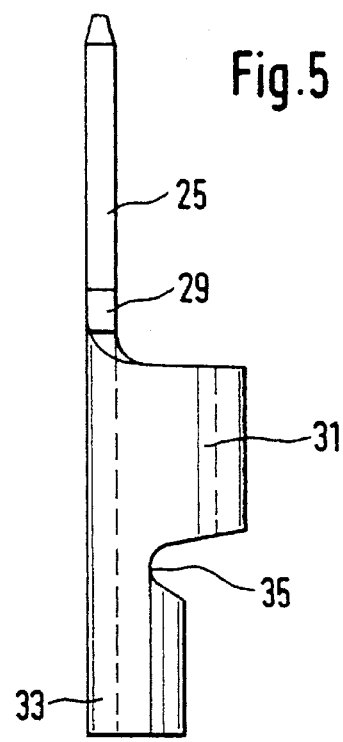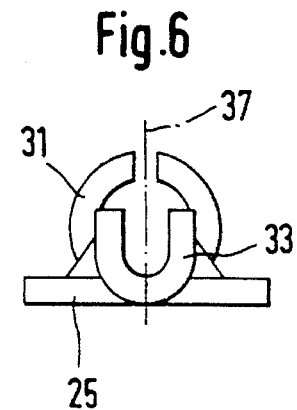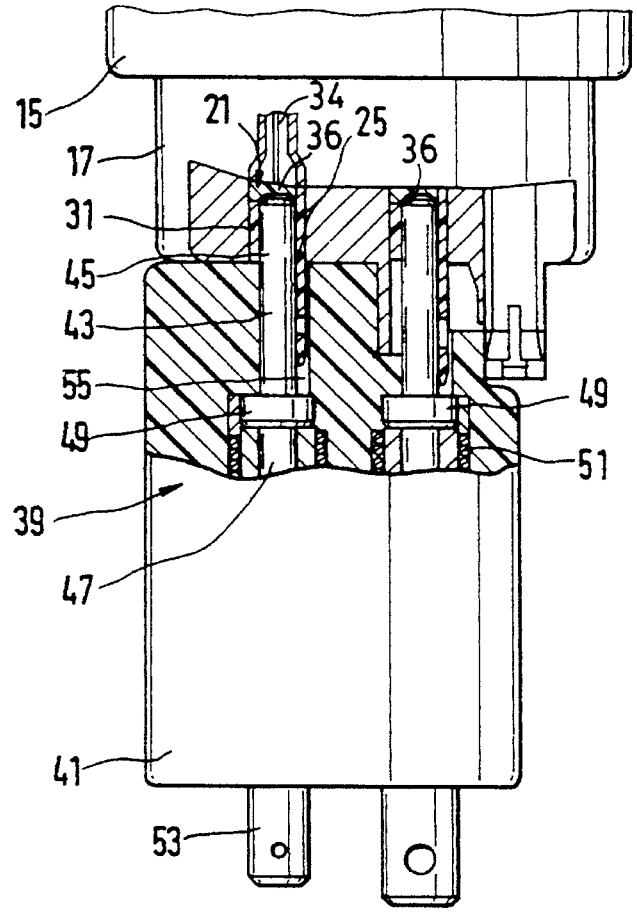

APPARATUS FOR FEEDING FUEL FROM A SUPPLY TANK TO AN INTERNAL COMBUSTION ENGINE

BACKGROUND OF THE INVENTION

The invention is directed to improvements in a feed assembly for an internal combustion engine. In a feed assembly of this kind, known from German Utility Model 91 04 728, a feed pump driven by an electric drive motor and disposed with it in a common housing feeds fuel from a supply tank to an internal combustion engine via a pressure line. The common housing, through which the fuel flows, is closed off by a connection cap, which on its outside has a connection piece for connection with the pressure line and two electrical plug connections embodied as flat plugs and connected to the drive motor. It is also known that electric drive motors, especially DC motors, have to be provided with radio interference suppression because of the brush firing occurring at the collector brushes; these radio interference suppression units, typically formed as capacitors and chokes, can be integrated into the connection cap, for instance. The known feed assemblies have the disadvantage, however, that these radio interference suppression units are not flexible or adaptable to prevailing conditions after installation of the feed, and the result is poorly adapted radio interference suppression units or major expense for installation and manufacture.

OBJECT AND SUMMARY OF THE INVENTION

It is a principal object of the invention to provide a feed assembly having the advantage over the prior art that by means of a combined flat and round plug connection on the connection cap with both a flat plug and a round plug receptacle, it is possible to mount the electrical connection for the electric drive directly on the connection cap, or if necessary to mount an additional electrical unit to the connection cap as well, preferably a radio interference suppression unit, by means of round plugs. It thus becomes possible to use a standardized connection cap for at least two feed assembly versions, or in other words with or without the additional radio interference suppression unit, which because of the number of common parts lowers the production cost.

It is a further object of the invention to make possible without major installation effort or expense and without additional adaptors the installation of one additional radio interference suppression unit after installation of the feed assembly, so that the radio interference suppression of the feed assembly can be adapted better overall to prevailing requirements.

It is another object, and especially desirable from a production standpoint to manufacture the combined flat and round plug connection element as a one-piece shaped sheet-metal part, which element can be inserted with its round plug receptacle, embodied as a slit sleeve, into a receiving bore of the connection cap and can then be extrusion coated with plastic in the connection cap by means of a U-shaped profile that receives the cable to the drive motor, and which with its flat profile protruding axially from the outside of the connection cap forms a flat plug in a known manner.

It is still another object of the invention to provide an extrusion coating of the U-shaped part of the shaped sheet-metal part in the connection cap with plastic, which makes it possible not only to attain good sealing of the feed assembly but also to attain the requisite play, for the sake of a certain elasticity of the slit sleeve, between the sleeve and the receiving bore.

Yet another object of the invention is attained by the simultaneous use of a round prong, disposed in the additional, mounted radio interference suppression unit, as a choke core and round plug, since in this way one additional component can be dispensed with, and this round prong and the choke slipped onto it are extrusion-coated with plastic.

The invention will be better understood and further objects and advantages thereof will become more apparent from the ensuing detailed description of a preferred embodiment taken in conjunction with the drawings.

BRIEF DESCRIPTION OF THE DRAWINGS

FIGS. 4–6 show the shaped sheet-metal part forming the combined flat and round plug in three different views; and FIG. 7 shows the connection cap of FIG. 3 with a radio interference suppression unit mounted onto it.

DESCRIPTION OF THE PREFERRED EMBODIMENT

Figure 1:
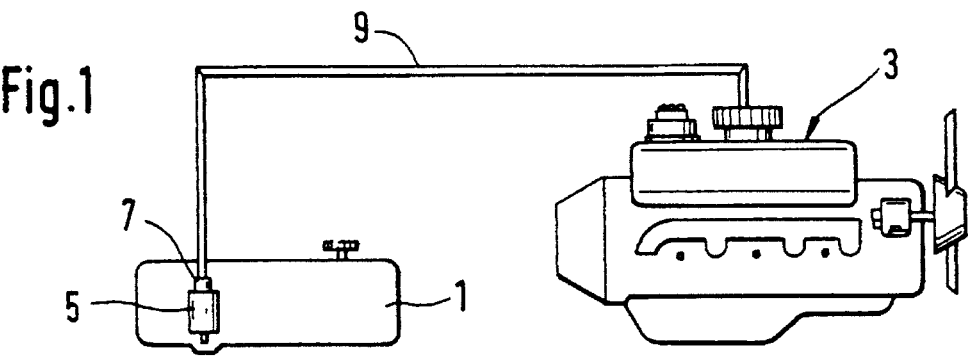
FIG. 1 is a basic illustration of a fuel feeding apparatus which belongs to a motor vehicle.

FIG. 1 shows a simplified view of an apparatus shown in FIG. 1 for feeding fuel from a supply tank 1 to an internal combustion engine 3 of a motor vehicle, not shown in detail, having a feed assembly 5 disposed in the supply tank 1 and communicating with the engine by means of a hydraulic connection piece 5 and a feed line 9 connected to that.

Figure 2:
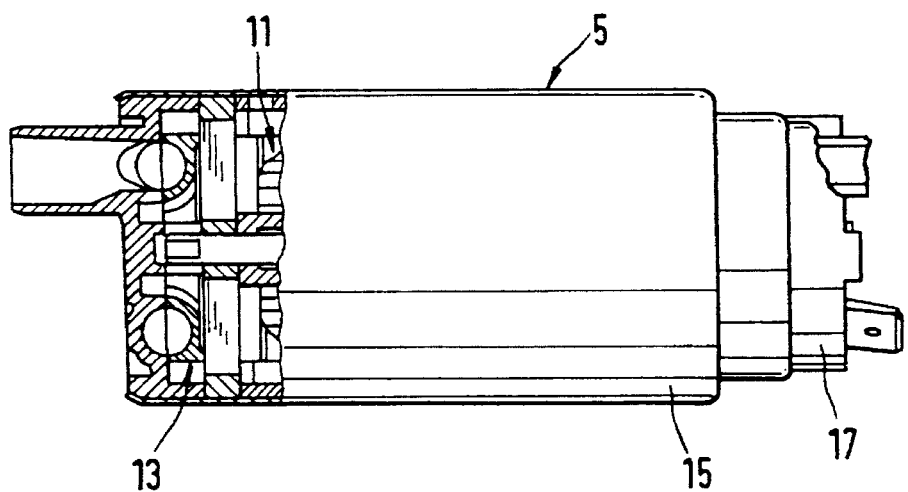
FIG. 2, partly in section, shows a feed assembly belonging to the apparatus of FIG. 1, on a larger scale.

The feed assembly 5, shown on a larger scale in FIG. 2, also has an electric drive motor 11, which drives a feed pump 13 to rotate; the feed pump may comprise a flow or positive displacement pump, and the feed pump 13 and drive motor 11 are accommodated in a common housing 15, which is tightly enclosed by a connection cap 17 on its face end remote from the feed pump 13.

Figure 3:
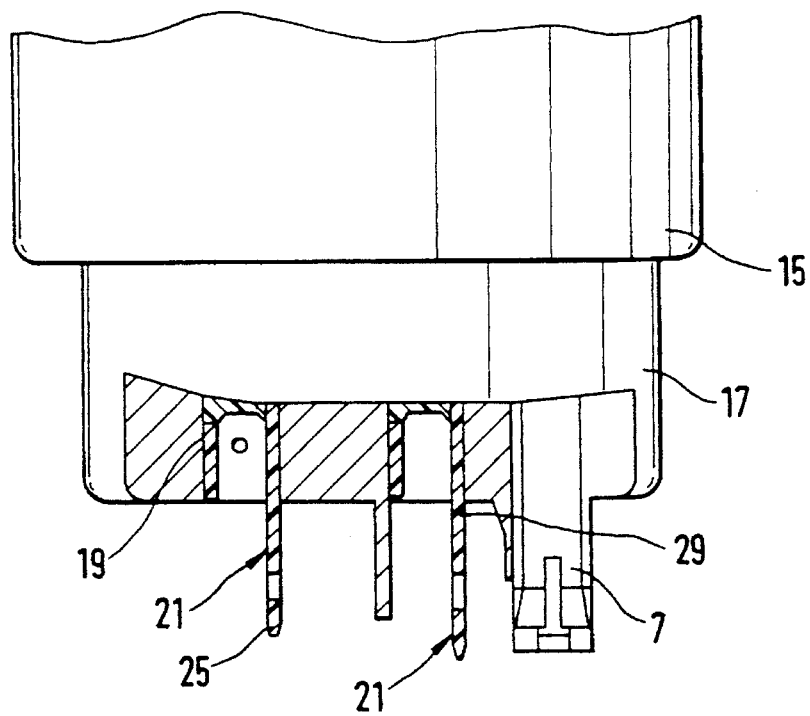
FIG. 3 is a further partial section from FIG. 2, showing the connection cap with the flat and round plug combination.

The hydraulic connection piece 7, by way of which the feed line 9 is flanged to the feed assembly 5, is disposed in this connection cap 17, shown on a larger scale in FIG. 3. In addition, the connection cap 17 has two receiving bores 19, into each of which one combined flat round plug connection 21 is inserted, each of said plug connections include a slit sleeve 31 and a U-profile section the inside of the connection cap 17 which is connected electrically to the drive motor 11; its connection cable is soldered into the flat plug with the round plug receptacle 21 in such a way that the connection cap 17 is tight. The combined flat and round plug receptacle 21 is embodied as a one-piece shaped sheet-metal part, which is shown in further detail in three views in FIGS. 4–6 and will now be described.

The shaped sheet-metal part has three regions, of which a first region 25, beginning at a first face end 23, has a flat smooth profile forming the flat plug, and a through bore 27 for securing electrical connections is made in this region. On its end remote from the face end, the flat plug 25 also has a pair of oppositely disposed, outward-protruding ribs 29, which ribs form a stop when the shaped sheet-metal part is inserted into the receiving bores 19. On the side of the rib 29 remote from the flat plug 25, a second region 31 of the shaped sheet-metal part adjoins it in an axial extension; this region is embodied as an elongated slit sleeve, and the transition between the first region 25 and the second region 31 is rounded in order to prevent cracking at the level of the rib 29.

The end of the slit sleeve 31 remote from the flat plug 25 is adjoined in an axial extension by a third region 33 of the shaped sheet-metal part, which is embodied as a U-profile section with rounded edge transitions; the transition between the slit sleeve 31 and the U-shaped profile 33 is likewise made via a radius-like recess 35, to avoid surges in tension that cause cracking. To ease production of the shaped sheet-metal part forming the combined flat and round plug receptacle 21, this part is made in one piece; the slit sleeve 31 and the U-shaped profile 33 are preferably produced by a stamping operation. To that end, the shaped sheet-metal part is embodied symmetrically for this purpose, so that the slit sleeve 31, U-shaped profile 33 and flat plug 25 have the same plane of symmetry 37, shown in FIG. 6, and the wall thickness of the slit sleeve 31 and of the U-shaped profile 33 is equal to the wall thickness of the flat plug 25, and the inside diameter of the slit sleeve 31 is larger than that of the U-shaped profile 33. Finally, a wall surface of the flat plug 25 defines a tangent to an inside wall surface of the round plug receptacle 31.

For installation of the shaped sheet-metal part into the feed assembly 5, this connection element 21 is inserted with the U-shaped profile 33 and the slit sleeve 31, as shown in FIG. 3, into the receiving bore 19 of the connection cap 17 as far as the stop 29, therefore the flat plug end 25 protrudes axially from the cap. The connection cable 34 of the drive motor 11 is placed in the U-shaped profile 33 and soldered, and the shaped sheet-metal part is furthermore extrusion coated with plastic 36 in the region of the U-shaped profile 33 in the connection cap 17, so that the connection cap 17 seals off the interior of the feed assembly 5.

FIG. 7 shows the connection cap 17 with an additional electrical unit 39 electrically connected with the electrical elements 21 in the cap 17; in the exemplary embodiment, this unit 39 comprises a radio interference suppression unit. Two round prongs 43 are inserted into a cylindrical housing 41 of the radio interference suppression unit 39; a first portion forms a round plug 45 protruding axially out of the housing 41, and a second portion, separated from the first via an annular rib 49, forms a choke core 47, onto which a choke (coil) 51 is slipped. The choke 51 and the prongs 43 are extrusion coated with plastic inside the housing 41 and sealed off from one another. On its face end remote from the exit of the round plug 45, the housing 41 of the radio interference suppression unit 39 has two axially protruding flat plugs 53, each of which is connected to one round prong 43 and serves as an electrical connection. Embodying the round prong 43 as a choke core 47 and simultaneously as a round plug 45 is especially advantageous for the sake of simple manufacture. To connect the radio interference suppression unit 39 with the connection cap 17, the ends of the round plugs 45 projecting axially from the housing 41, as shown in FIG. 7, protrude into the slit sleeves 31 forming the round plug receptacle; between the round plugs 45 and the plastic filling surrounding them, a flat slitlike recess 55 is provided, which is complemental to the form of the flat plugs 25 on the connection cap 17 and into which the flat plugs 25 protrude when the radio interference suppression unit 39 is mounted, which further improves the electrical contact and the firmness of the plug connection via an electrical contact between the flat plugs 25 and the round prongs 43.

It is thus possible, as a result of the simple expedient of a combined flat and round plug receptacle 21 in the connection cap 17 to connect the feed assembly 5 directly electrically as needed, or to mount an additional electrical component 39, in order to change the functional properties, such as radio interference suppression, of the feed assembly 5.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An assembly for feeding fuel from a supply tank (1) to an internal combustion engine (3) of a motor vehicle, comprising an electrical drive motor, a feed pump (13) driven to rotate by said electrical drive motor (11), said feed pump and said electrical drive motor are disposed in a common housing (15), said housing being enclosed on one end by means of a connection cap (17) provided with a hydraulic connection piece (7), said connection cap including two electrical connection bores (19) that extend into an outer face end of the connection cap, each said electrical connection bore receives one end of a flat end plug electrical connection element (21) arranged to protrude into one of the bores of the connection cap and which is connected electrically to the electric drive motor, each said flat end plug electrical connection element having a female round plug receptacle region to which one additional electrical component (39) can be connected by means of further male round plug connection elements.

2. An assembly as defined by claim 1, further wherein the flat end plug electrical connection element comprises at least one flat plug region (25) that protrudes axially from the outer face end of the connection cap (17), and the female round plug receptacle region comprises at least one round plug receptacle (31), into which receptacle said male round plug connection element of the additional electrical component (39) is insertable.

3. An assembly as defined by claim 2, further wherein each flat end plug electrical connection element is embodied as a one piece shaped sheet-metal part (21) insertable into said receiving bore (19) of the connection cap (17), said flat end plug electrical connection element having at least two partial regions, a first region (25) beginning at a first face end (23) which defines a smooth, flat profile forming a flat plug region, said flat plug region adjoins axially a second region (31), which defines a slit sleeve forming the female round plug receptacle region.

4. An assembly as defined by claim 3, further wherein there is defined on the one-piece shaped sheet-metal part (21) a third region (33), embodied with a U-shaped profile, disposed on one end of said one-piece shaped sheet metal part (21) remote from the flat plug region (25), said third region axially adjoining said second region, said second region tapering into said third region, which has an inside diameter smaller than an inside diameter of the slit sleeve.

5. An assembly as defined by claim 4, further wherein a cross section of the U-shaped profile region (33) and a cross section of the slit sleeve region (31) have a common plane of symmetry (37), which plane extends at right angles to the plane of the flat plug region (25); a wall thickness of the slit sleeve region (31) and of the U-shaped profile (33) is equal to a wall thickness of the flat plug region (25); and a wall surface of the flat plug region (25) forms a tangent to an inside wall surface of the round plug receptacle (31).

6. An assembly as defined by claim 5, further wherein the one-piece shaped sheet-metal part (21) having first, second and third regions forming the flat end plug electrical connection element has a radius-like recess (35) defined between the slit sleeve (31) and the U-shaped profile (33).

7. An assembly as defined by claim 4, further wherein each flat end plug electrical connection element protrudes with said second and third regions (31, 33) all the way into the receiving bore (19) of the connection cap (17) after installation therein and rests on an outer end wall of the connection cap (17) via a stop, said stop being formed by ribs (29) disposed on the flat plug region (25) adjacent said second region.

8. An assembly as defined by claim 7, further wherein an electrical connection cable (34) of the drive motor (11) is placed in the U-shaped profile (33) and secured, and that each flat end plug electrical connection element is extrusion-coated with plastic in the connection cap (17) in the region of the U-shaped profile (33).

9. An assembly as defined by claim 1, further wherein the additional component (39) mounted on the connection cap (17) comprises a radio interference suppression unit with chokes (51).

10. An assembly as defined by claim 9, further wherein the radio interference suppression unit includes round male plugs (45) formed by round prongs (43) that simultaneously act as a choke core (47), onto which at least one choke (51) is disposed and the choke core (47) and round male plugs (45) are partitioned off from one another by an annular rib (49) and are extrusion-coated with plastic in a housing (41).

* * * * *